Dec. 31, 1940.   J. W. PAYNE   2,226,535
KILN
Filed April 6, 1940

INVENTOR
John W. Payne
BY
Arthur J. Danner
ATTORNEY

Patented Dec. 31, 1940

2,226,535

UNITED STATES PATENT OFFICE 2,226,535

KILN

John W. Payne, Woodbury, N. J., assignor to Socony-Vacuum Oil Company, Incorporated, New York, N. Y., a corporation of New York Application April 6, 1940, Serial No. 328,243

9 Claims. (Cl. 202—95)

This invention relates to the treatment of finely divided solid materials in the presence of gases or vapors and/or heat at closely controlled temperatures. The invention particularly relates to the regeneration of spent adsorbent type materials such as clays, activated clays, synthetic alumina-silica compositions, bauxite and the like which have been used in processes tending to exhaust the utility of the adsorbent by clogging, coating or impregnating it with liquid or solid materials of a combustible nature, as, for example, oily, tarry, or carbonaceous materials and which is regenerated for re-use by the application of heat to the spent adsorbent resulting in the driving off or burning off of inactive impurities. This application is a continuation-in-part of my co-pending application Serial Number 279,008, filed June 14, 1939, which, in turn is a continuation-in-part of my application Serial Number 210,150, filed May 26, 1938.

In regeneration of petroleum filter clays, for instance, as carried out today, the clay suffers a loss in efficiency with each burning or regeneration until finally it cannot be regenerated to a sufficiently high activity to warrant further regeneration, at which time the clay is discarded to waste. Since clays which have had a different number of burnings have different efficiencies, they are usually kept separate and separately classified. In general filter clays are only regenerated about five to eight times and practically never more than ten to fifteen times before they are thrown away.

The problem of regenerating clays is complicated by the sensitivity of the clays to high temperatures. While temperatures around 900° to 1150° F. are desired to burn off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that present methods in general permit overheating; this appears to be true, moreover, from the fact it would be extremely difficult to control precisely the temperature of all the clay in present methods.

In the past various apparatuses have been devised for carrying out the regeneration of spent filter clay. One of the first was merely an open hearth upon which the clay was spread and burned. Today there are three principal types of burners in general use. In the first type the clay falls or cascades over baffles set at about a 45° angle through a flue countercurrent to gases of combustion. In the second type the clay is regenerated in a rotary kiln slightly inclined from the horizontal. In the third type, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these commonly used burners the temperature is controlled principally by adding steam or water, cutting the fires, regulating clay feed rate and regulating the concentration of oxygen passed into the burner and therefore the rate of oxidation.

The kilns or burners which are now in common use are relatively inefficient because of absence of proper temperature control for preventing overburning of clays, comparatively small throughput per unit volume of burner, and inefficient utilization of the heat developed in burning the oil or other carbonaceous matter left on the clay, thus requiring considerable quantities of additional fuel to complete combustion.

Other apparatuses and methods have been proposed but have not displaced the three above-described burners to any appreciable extent. This very fact that other burners have not been taken up by the art is believed conclusive that each one suggested is subject to limitations which prevent regenerations as efficient as, or at least any more efficient than, those already enjoyed by the art. While such a fact is not usually so conclusive, it is believed to be in the present case in view of the tremendous amounts of clay used and thrown away each year and the increased amount that is necessary because of the successive loss in efficiency. Moreover, in view of the fact that clays and like materials are not used in just one industry but in many, with a universal desire existing for improvement, it is believed impossible that any method which effects any substantial improvement over those now employed could go unnoticed and undeveloped. This view may well be appreciated when it is realized that a single lube oil refinery in the petroleum industry alone may regenerate over 75,000 tons of filter clay each year.

As a result of my research I have striven to devise an apparatus which would be commercially feasible for handling large quantities of clay and would permit burning off of inactive impurities from the clay at optimum temperatures while at the same time affording such constant uniform heat control of all the clay under such closely controllable temperature conditions that substantially none of the clay would be subjected to a deleterious temperature. It is believed the improved results I obtain with my present apparatus are largely due to the fact that this method permits burning of clay under substantially these conditions. For the same reasons, my present apparatus may be used with advantage in processes in general wherein finely divided solids are treated at closely controlled elevated temperatures.

It is an object of my invention to provide an apparatus for the elevated heat treatment of a moving stream of finely divided solids which permits uniform temperature control over each solid being treated throughout the period of its treatment.

Another object is to provide an apparatus for conducting a treatment wherein a moving stream of solid particles is directly contacted with gases or vapors which apparatus affords a uniform temperature control over each solid particle throughout its presence in the treatment and makes proper provision for passage of the gases or vapors through the solid particles.

A more specific object of the invention is to provide an apparatus for subjecting a stream of porous adsorptive material of relatively small particle size, or other small particle size solids, to a heat treatment wherein the adsorptive material flows countercurrent to gaseous medium in substantially a solid column of particles with proper gas paths formed therethrough and a uniform temperature control is maintained over each particle throughout its period of treatment.

Still another specific object of the invention is to provide a practical apparatus for regenerating a moving stream of spent adsorptive material such as filter clays and the like having carbonaceous impurities deposited thereon by reacting said carbonaceous impurities with a gaseous oxidizing medium which apparatus suitably flows the adsorptive material countercurrent to the gaseous medium and controls the temperature of the adsorptive material such that efficient regeneration will be effected without subjecting the material to deleterious temperatures.

An important object is to provide an apparatus which permits the continued regeneration of filter clays to a higher efficiency than heretofore obtained and which substantially eliminates progressive degradation in efficiency with successive regenerations.

Another object is the provision of an apparatus capable of accomplishing high unit throughout per unit of capital invested and space occupied.

An important object is the provision of an apparatus having a few moving parts and capable of easy and economical maintenance and operation.

A further object is the provision of an apparatus which permits more efficient utilization of the heat developed in the apparatus. These and other objects will appear from the following description of my invention.

In my co-pending case S. N. 279,008, I disclose and claim a kiln or treating chamber containing a treating zone with means to pass solid particles therethrough in direct contact with a gaseous medium, the treating zone being provided with baffling means and temperature control means. The baffling means prevent channeling that results in the gas and particles not properly contacting each other, and, on the other hand, provide proper baffling of the particles to facilitate the flow of gas through the particles. The temperature control means conducts a flowing, temperature-controlled heat exchange medium within sufficiently close indirect heat transfer relationship with every particle throughout its presence in the zone that proper treating temperatures may be maintained without any deleterious temperature occurring.

The present invention is directed to a specific modification of the general type apparatus forming the subject matter of my abovementioned application S. N. 279,008. In the present apparatus the means for conducting the heat exchange medium are provided with baffling means which comprise winding fin members which serve to distribute the particles during their passage through the apparatus so as to afford winding passageways for a gaseous agent through the apparatus which permit gaseous agent therein to pass countercurrently through the apparatus in direct contact with the particles without unduly disturbing the general direction of flow of the particles.

As has been stated, the present invention may be used in the treatment of finely divided solids in general in order to change their physical or chemical character or both. Particularly typical of materials that may be treated in my apparatus are those spent filter clays or other adsorbents derived from the filtration of mineral oil products such as waxes, turbine and transformer oils and particularly the usual lubricating oils; or from filtration of vegetable oils; sugar liquors; etc., which spent clays or other adsorbents contain adsorbent combustible materials such as tarry, oily or carbonaceous matters and are regenerated for re-use by the heating or burning of the combustible material adsorbed thereon. In some instances it may be desirable to burn off only inactive carbonaceous impurities while carbonizing a part of the carbonaceous impurities to form an active carbon layer on the adsorbent.

Other typical materials which may be treated are catalytic materials composed of solid particles which have been used in some catalytic process of refining or conversion until sufficiently contaminated with impurities that regeneration or revivification is required or desirable and wherein the inactive impurities deposited on the catalyst are removed by treating the catalytic material at elevated temperatures. For instance, in the catalytic cracking of petroleum oils using finely divided solid catalyst material, e. g., clay-type catalysts, the catalyst becomes contaminated with a carbonaceous deposit of the nature of coke which must be removed from time to time in order to regenerate the catalyst, and this removal is usually effected by burning off the impurities at closely controlled elevated temperatures.

For convenience the present apparatus will be described in detail with respect to regeneration of filter clay. However, it is to be understood the invention is not limited thereto but is directed to the whole field of regeneration of spent adsorbents by burning off inactive impurities as well as to the initial preparation of same, when necessary, including activating, drying, hardening and the like by application of heat. Likewise the present apparatus, as has been stated, may be used to advantage for the heat treatment of solid particles in general, as, for instance, in roasting of ores, certain drying processes etc., showing decided advantages for treatments wherein close temperature control is a necessity or a highly desirable condition and reactions are involved which produce or consume a considerable amount of heat.

In order that the invention may be readily understood, reference is now made to the accompanying drawing showing a preferred embodiment of my present invention and wherein.

Figures 1, 2, 3, 4:
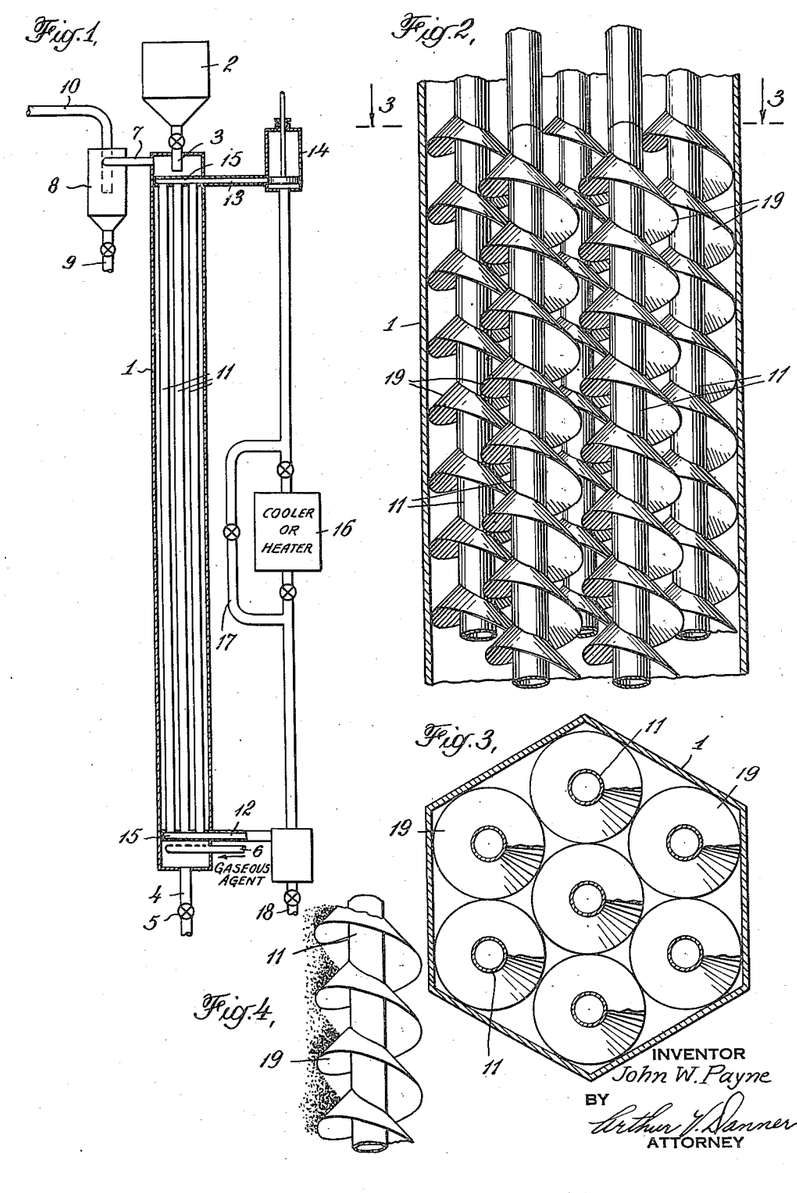
Fig. 1 is a schematic drawing of a general set-up of the apparatus.
Fig. 2 is a longitudinal section of a portion of the apparatus showing in detail the internal structure of the treating zone, the view being taken at an angle somewhat below the horizontal looking up underneath the baffles.
Fig. 3 is a horizontal cross-section of the apparatus at the line 3—3.
Fig. 4 is a detailed view of a part of one heat transfer tube and fin baffle with particles being treated in place.

Referring to Fig. 1 there is shown a kiln or treating chamber 1 which is of sufficient length, taking into account the increased length of path afforded by baffling means (not shown in Fig. 1), to provide proper length of treatment for material flowing therethrough. Spent adsorbent or other solid particles to be treated are stored in hopper 2 and fed to the upper end of chamber 1 through a throat 3, and thereafter the adsorbent passes downward through the chamber and is removed from the apparatus in revivified or treated condition by discharge 4 containing some device 5, which may preferably be a star wheel mechanism or some similar device for enabling the removal of adsorbent irrespective of the pressure maintained within the chamber 1. Of course, if atmospheric pressure is used no such device is necessary. Air, or other suitable gaseous agent, under pressure is fed through inlet 6 and passes upward through the chamber in countercurrent relationship to the descending adsorbent. The air departs from the apparatus through outlet 7 and is led into separator 8, which is a dust separator, preferably of the usual well-known cyclone type wherein fines and dust, if any, are separated from the moving stream of air. These separated materials are removed from or returned to the system through pipe 9 and air or flue gas is finally discharged through pipe 10. It is obvious that these arrangements permit the operation within the case to be carried out at pressures below, near, or materially in excess of atmospheric pressure.

In chamber 1 the counterflowing particles and gaseous agent directly contact each other to effect the desired treatment, e. g., in the usual regeneration of petroleum refining adsorbents a combustion occurs in which the carbonaceous impurities are burned from the adsorbent. In the event a combustible material such as bone-char is being regenerated, an inert gas, if any, may wholly or largely replace air and regeneration effected by heat alone, the inert gas "sweeping out" the vaporized impurities being preferably introduced into the apparatus in the manner disclosed for the air. In case other gases are used in place of or in addition to air, they may be introduced through air inlet 6 or separate inlets may be provided.

In the regeneration of spent petroleum filter clays, for instance, it may not always be desired to burn off all the pertoluem carbonaceous impurities but rather only inactive impurities. This may be done by reducing the amount of air or concentration of oxygen to a sufficient extent to only burn off a part of the petroleum impurities, the remainder being carbonized to form an active carbon layer on the clay. The concentration of oxygen may be reduced by merely reducing the amount of air or by replacing a part or all of it with steam or inert gases. My apparatuses are admirably suited for such treatments since they permit very close control of the atmosphere within the apparatus. For some oils, notably solvent refined petroleum oils, yields from such carbonized clays are from two to four times as great as from the same clay regenerated by complete burning. The use of carbonized clays for filtering solvent refined oils forms the subject matter of a co-pending case Serial Number 275,673 filed May 25, 1939, and the carbonizing of petroleum filter clays by processes in general rather than only the particular one herein disclosed forms the subject matter of the co-pending application Serial Number 275,672, filed May 25, 1939.

When combustion occurs under the circumstances above outlined in the presence of spent adsorbent containing carbonaceous impurities and air under pressure and in the absence of other agencies, there is a decided tendency to burning in a concentrated zone at extremely high temperatures, ruinous to most adsorbents. Likewise in operations in general of this type wherein there is a considerable consumption, evolution or application of heat, there is a tendency for localized or even general over- or under-heating. In order to control this tendency and suppress it, the burning zone is equipped with heat transfer tubes 11, through which there is circulated a fluid heat transfer medium which enters by pipe 12, leaves by pipe 13, and is circulated under the impulses produced by pump 14. Headers 15 connect pipes 12 and 13 of the external circuit with tubes 11 and are of any suitable construction which permits the clay to gravitate on through the space between the tubes. In order that control of the temperature of this circulating heat transfer medium may be had, there is inserted in the external portion of its circuit a heat exchange means 16 which, dependent upon the requirements of the process being carried out, may effect either cooling or heating. This heat exchange means 16 is provided with a by-pass 17 to facilitate control of the temperature of the circulating heat transfer medium. To permit addition or withdrawal of heat transfer medium for such purposes, for example, as making up losses or shutting down the system, there is provided a pipe connection 18.

A most important feature of the invention and one upon which the successful carrying out of the operation is largely dependent, is the provision of a proper treating or burning zone. To properly carry out the steps of the operation disclosed herein using countercurrent flow, the adsorbent must pass at a practical rate through the treating zone in one direction and the air in the other direction without either being allowed to channel or flow in a stream by itself without sufficient contact with the other medium. Furthermore, since my apparatus is particularly directed to treatments of relatively small particles, such as percolation clays, ores to be roasted, etc., which small particles pack together sufficiently that only very small gas voids are left between them, I have found that in order to successfully treat these small particles in my apparatus I must provide for suitable passage of the gas through the particles. In order to provide feasible passage, I baffle the gas and particles to form continuous, substantially particle-free passages for the gas which permits the gas therein to directly contact particles along at least one edge of the passages, or I at least redistribute the particles and gaseous agent at sufficiently frequent intervals that there is no such extended portion of unbaffled downflowing particles up through which gaseous agent must flow as to cause difficulties, such as "boiling" of the clay, in these portions.

Therefore I have found that the structures of the treating or burning zones for carrying out my invention have two principal requirements, namely, suitable passage means, as for example spaced conduits, for circulating fluid heat exchange medium and suitable baffle means for the solids and gaseous agent. The passage means should be so arranged as to keep temperature-controlled, circulating fluid heat exchange medium within sufficiently close proximity to each and every solid particle in the zone throughout their entire presence in the zone that proper temperature control of each particle may be had. The particular arrangement or provision of the fluid heat exchange medium throughout the zone is especially important and will be discussed more in detail hereinafter. The baffle means should be such as to (1) cause all the solids to have about the same length of flow through the zone, (2) redistribute the gaseous agent and solids so as to prevent such channeling, as does not afford proper contact of particles and gaseous agent, (3) aid in heat transfer (4) provide adequate passage way for the gaseous agent up through and in contact with solids, and (5) force the gaseous agent to take such a route through the zone that high rates of gas flow may be used without having any undesirable effect on the general direction the solids are moving. The functions of the baffle means set forth in (4) and (5) are increasingly important the finer the particle size of the solids.

In my co-pending application S. N. 279,008 I disclose that several structural means may be devised which meet the above requirements, including the present design. In Figs. 2–4, I disclose the particular structural means to which the present invention is directed. Referring to Fig. 2, tubular members 11 for carrying the fluid heat exchange medium are disposed within chamber 1, and a metal fin baffle is suitably attached or affixed to each tube, e. g., by welding, the fin being wound continuously along the tube, as shown, throughout the treating zone. It will be seen in Fig. 3 that the external peripheries of the fins 19 of adjacent tubes are in vertical alignment. From what I have disclosed herein it will be apparent that for best results these fins should be either so arranged or actually overlapping. In other words, there should not be any substantial cross area in the kiln above and below which, in a straight vertical line up through the length of the burner, there is no baffling, since otherwise there would be "short-circuiting" of the clay in this area, and the clay in the center of this area might not be kept sufficiently close to heat exchange surfaces. Of course, there might be a slight amount of this vertically free area before appreciably inferior results are encountered.

The object of having the fins wind along each tube is to provide winding substantially continuous particle-free gas passageways up through the case underneath each fin which permit gas therein to directly contact the particles along at least one edge of the passageways. While the fins are shown as uniform helical baffles they may be of any equivalent structure which affords the desired result.

In the preferred operation the particles fill the case, moving therethrough in substantially a solid column of particles, and thereby form an outer side wall to the gas passageways (see Fig. 4) where the gas and catalyst are in direct contact. A further feature may be provided by using baffles of mesh wire construction, the mesh of which is too fine to permit passage of particles, and, thereby, the burning or reacting surface of the chamber is practically doubled since the burning or treating not only occurs along the above mentioned "outer side wall" but also along the face of the baffles that the particles move over.

While the fins might be positioned at right angles to the tubes or even slanted slightly upward, most efficient results are had by slanting the fins downwardly to give them a slope which is at least as great as the angle of repose of the particles being used. On the other hand the slope should not be too great, as the size of the gas passage is thereby reduced. We have found a slope of about 45° to be quite satisfactory for most uses. The pitch of the continuous spiral or helical fin should not be so great that the particles more or less fall straight through the case, but rather should be at a more moderate pitch so that the particles substantially ride the baffles, i. e., they ride each baffle a short ways, perhaps a quarter of a turn, before falling to the next baffle. Also if the pitch is too great no air passage is provided. It may be found of advantage to have adjacent fins of opposite winding so that particles riding down thereon will be traveling in opposite directions, collide and thereby effect more thorough redistributing.

The size of the particles that may be treated in my apparatus is limited by the air velocity required for feasible operation. For this reason clay particles treated should be of a granular nature for best results, for instance, 100 mesh or larger, as otherwise trouble may be encountered in obtaining a uniform downward flow of the solids. The invention is particularly feasible for regenerating filter clays of around 30–60 mesh. However it is to be understood the invention is not restricted as to the exact size of the particles but rather to the general application of the process herein disclosed to solid particles of any size wherein the objects of the invention are attained, particularly since particles of different materials, e. g., particles of ores to be roasted and spent porous particles to be regenerated, may vary appreciably in weight for the same size. Since the heat transfer in the present process should be partially by conductance, the treating zone, for best results, should be filled with the solid particles which then gravitate in a more or less solid column through the apparatus.

An important feature of the present invention is the provision for proper use of fluid heat exchange medium and the structure whereby the solids are intimately contacted with counter flowing gases while each individual particle of the solids, during substantially the entire duration of the reaction, is within sufficiently close proximity to the heat exchange medium that no deleterious temperature condition is created.

In order to obtain proper temperature control, the heat exchange medium must be adjusted to a proper temperature, for extracting or adding the necessary heat. Moreover heat exchange medium must be flowed in sufficient amount in close indirect heat exchange with every solid particle and then cooled or heated to readjust its temperature by means extraneous of the reaction heat before the medium's temperature reaches an undesired value. In this way the heat exchange medium in my invention continuously controls the temperature of the zone making immediate compensations for temperature changes whereby no deleterious temperatures occur.

When the operation is first started the heat exchange medium may add some heat to help initiate the reaction or treatment, or at least the medium should not be at such a low temperature as to substantially hinder such initiation. after the operation is started the exchange medium is circulated throughout the zone adding or abstracting heat as required. In my invention the heat exchange medium is maintained at all points in the regenerating zone at a temperature below temperatures which cause substantial damage to the clay (or if other operations are being conducted, below temperatures which cause heat damage thereto), and, of course, at a temperature above which undue cooling occurs so that the regeneration (or other treatment) can not proceed efficiently. For instance, in the usual regeneration of filter clays and the like we preferably maintain the heat exchange medium at a temperature around 850°–900° F. and never above about 1050° F. By so controlling the heat exchange medium and flowing a sufficient amount within sufficiently close indirect heat exchange with each particle, a close uniform temperature control is maintained over every particle so that no deleterious temperatures occur which cause injury to the particles or treating operation. Moreover the entire zone will be maintained under the same close uniform conditions.

While temperature-controlled, circulating gaseous heat exchange mediums of high specific heat might be used in some instances, I greatly prefer the use of liquid heat exchange mediums since necessary pumping and pressure facilities for proper use of even the best gaseous mediums, e. g., hydrogen, would, in many instances, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, I prefer the use of fused salts. A particularly preferable mixture of this kind is a mixture of the alkali metal salts of nitric and nitrous acids. In certain cases suitable liquid heat exchange media might be found which have a boiling point around the desired operating temperature, in which case, the heat exchange medium, although mostly in the liquid state, might undergo some transition whereby advantage could be taken of its heat of vaporization or condensation. By the use of liquid heat exchange media and by having them in sufficiently close proximity to all particles undergoing reaction an extremely close and uniform temperature control may be maintained.

In the preferred practice the heat exchange medium is maintained at substantially the temperature of the treatment being controlled, e. g., above the minimum temperature at which proper treating is obtained and below the minimum temperature at which undesirable heat injuries occur such as substantial damage to the particles or reaction. Such practice may be carried out effectively when the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and suitable cooling or heating of the heat exchange medium in its circuit maintains the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling granules. A further advantage in this practice results from the complicated structure of apparatuses for affording proper temperature control. The structure involves an exposure of tremendous amounts of heat conducting walls. When two widely different temperatures are maintained on different sides of these walls thermal expansion difficulties may arise causing buckling, etc. However when substantially the same temperature is maintained throughout, the apparatus operates without strain or difficulty.

As a result of the close uniform temperature control afforded by my process many important advantages are obtained. For instance, the process of regenerating spent filter clays by burning is substantially revolutionized. Thus in my process, since I provide adequate temperature control, I preferably use not substantially more than the theoretical amount of air or oxygen to burn the carbon as contrasted to prior methods which use large excesses of oxygen. As a consequence the carbon on the clay or adsorbent usually furnishes all the necessary "fuel" for burning so that no additional fuel need be added, and, quite in contrast to prior methods, my heat exchange medium may either extract or add heat to the clay. To offset overcooling and to heat the portion not under combustion in the prior processes, there have been various suggestions of heating indirectly with hot combustion gases. It is to be noted however that these exchange mediums add heat rather than extract, and, moreover, being at high temperatures, above clay-damaging temperatures, they subject the clay to additional dangers.

In some treatments, as for instance, in carbonizing some clays, the reaction or treatment may not give out sufficient heat for its needs or it may even be endothermic. In such a case my heat exchange medium will supply heat to the operation rather than extract heat, nevertheless, the principles are the same with the medium being heated by the "extraneous" means rather than cooled and as before always maintained below temperatures which cause heat damage to the clay or other material or treatment being conducted.

As has been indicated hereinabove, one of the important features of the present invention is the provision of a treating zone whereby the circulating fluid heat transfer medium may be maintained at all times within sufficiently close proximity to every granule in the burning zone that no deleterious temperatures will be created. Obviously this maximum distance that each granule might be from the heat transfer medium may vary with the materials treated, the atmosphere in the burning zone, the reaction being carried out, the amount of impurities being burned, mass velocity of air, physical properties of the liquid heat transfer medium, etc. Accordingly it would be difficult to specify the maximum distance that may be used for every operation to which my apparatus may be put. However, in general, this distance should not exceed about 1½ to 2 inches in order to afford proper temperature control, a distance of 1½ inches being well suited to the regeneration of clay. Furthermore, it has been found that the volume expressed in cu. in., that may be occupied by the clay or other material should be about ¼ to 3 times the area of heat transfer surface, expressed in sq. in. In the regeneration of fuller's earth it is preferred to maintain this ratio within the range of about ½ to ⅜.

The rate of heat liberation per unit of time per unit of volume is a function of the mass velocity of adsorbent, of the amount of "carbon" to be burned therefrom, and of the mass velocity of the air. Experimentation has established that optimum conditions of burning occur in those ranges of mass velocities wherein the adsorbent is almost supported by the rising air, the upper limit being of course at air velocities so great that adsorbent of the size being burned will not fall, but will float. Since this velocity will vary with the apparent specific gravity of the clay, which apparent specific gravity is a function of the real specific gravity and the particle size, the limiting velocity is not a single velocity, but a range, defined as above. The inter-relation of adsorbent rate, "carbon," and air rate may be expressed best as that combination of rates, which in the case of fullers' earth, for example, while not exceeding about 1150° F. under conditions of operation, will remove carbon at the rate of about 0.3 to about 2.0 pounds per hour per cubic foot of chamber volume for a broad range of possible operation, and from about 0.5 to 1.5 pounds per hour per cubic foot of chamber volume for preferred operation. The mass velocity of heat transfer medium of course depends upon the specific heat and other characteristics of the medium. In operations where it is desirable to maintain the adsorbent at a relatively uniform temperature, the mass velocity is best defined as that mass velocity of heat exchange medium which will extract the required amount of heat while undergoing a temperature rise of not greater than about 50° F, and preferably of from 2° to 10°.

Hereinabove it has been usually indicated that the temperature of burning should not rise above about 1150° F. This temperature is specific to materials of the nature of fuller's earth, and for different materials having different optimum regeneration temperatures, the proper specific temperature should be the basis of design and operation.

In order to show a specific application of the above broad principles of design, the following example is given. It is to be understood the invention is not to be limited by this example which is merely for illustrative purposes to show a specific application of the invention. The example represents a particularly feasible commercial apparatus for regenerating spent petroleum percolation clay using a molten salt heat exchange medium.

Length of chamber including separator chamber___ 20 feet.
Minimum diameter between sides (hexagonal design)_ 19 inches.
Number of tubes___________ 37.
Length of tubes___________ 18 feet.
Diameter of tubes_________ 1 in. O. D.
Spacing of tubes (triangular pattern)______________ 3 in. centers.
Width of fins_____________ 1.42 in.
Projection of fins_________ 1 in.
Pitch of fins______________ One turn per 2 inches.
Slope of fins_____________ 45° downward from horizontal.
Volume of chamber occupied by clay______________ Approximately 50%.

The enormous difference in size between an apparatus of my design and a conventionally used multiple hearth furnace, both of which have a capacity of around 50 tons of clay per day, may be seen from the following data:

|  | My kiln | Multiple hearth kiln |
|---|---|---|
| Height_________________________feet__ | 22 | 25 |
| Diameter________________________do___ | 3½ | 16 |
| Weight_______________________pounds__ | 25,000 | 500,000 |
| Burning surface___________________square feet__ | 1,800 | 970 |

Thus it will be seen the multiple hearth furnace has a diameter nearly 5 times greater and a weight 20 times greater. Moreover the above data shows that per unit volume the contacting surface of my kiln is about 44 times that of the multiple hearth kiln which explains the tremendous capacity of my kiln with respect to its size.

Certain items of interest may be noted. The maximum pressure drop for air in designs having about 50% of the volume occupied by clay is about 3 inches of water per foot of chamber when operating near atmospheric pressure. The amount of air used is about 10% or more in excess of that theoretically required. At burning temperatures of about 1000-1050° F. the temperature control is easy and positive and no portion of the clay need rise above 200° F. higher than the temperature of the heat transfer medium.

An important feature of this invention is the ability to obtain accurate temperature control. That accurate temperature control is of importance is readily proven by the fact that spent filter clay when treated under conditions usual in the art must be discarded after about five to twelve burns, while, if treated under proper and accurate temperature control, it is substantially unimpaired in filtration efficiency after 15 to 20 regenerations.

Since one may now dispense with the enormous quantities of excess air normally used, a more efficient utilization of exothermic heat of regeneration is possible, so much so that most spent filter clays will be found to contain enough combustible for their own regeneration without burning added fuel.

Thus it will be seen that a revolutionary improvement in clay regeneration is obtained by the use of my apparatus, i. e., the efficiency of the clay regenerated in my apparatus is substantially higher than clay which has been regenerated the same number of times in conventional kilns. As is known, the decolorizing efficiency of clay after about 5 to 12 regenerations in the multiple hearth burner is reduced to around 50-55% of that of fresh burned (new) clay, and, therefore, ready to be thrown away. The average efficiency of these No. 1 to No. 12 clays is around 70% on the same basis. On the other hand starting with fresh clay and conducting regenerations in my apparatus, the efficiency of clay after even 18 regenerations is still around 95-100% and the average efficiency of No. 1 to No. 18 clays is approximately 100%. The tremendously decreased "clay cost" which results by use of my apparatus is obvious from the above. Theoretically it appears that the clays may be efficiently regenerated forever in my apparatus. There is a purely mechanical loss of clay, however, from handling which amounts to about 2% per burn so that after about 50 burns all of the original clay would be lost in this manner. It is to be further noted that the prior art operates at an average efficiency of around 70% while I operate at an average efficiency of around 100%. Therefore, in the filtering step alone, I obtain around 30% increased efficiency for the year's operation.

In addition to the important advantage of positive temperature control whereby clay is reactivated to higher efficiency than that obtained by the prior art, as set forth above, the present apparatus has several other distinct advantages over the commonly used methods. Not the least of these advantages is the fact higher throughput of clay per unit volume of burner is possible. I have varied the rate of clay throughput in my apparatus from 16 lbs./hr./cu. ft. of kiln volume to 75 lbs./hr./cu. ft. of kiln volume without any marked effect on the degree of reactivation. In certain cases the throughput is 15 to 30 times that of present multiple hearth burners. Quite obviously a distinct improvement is afforded by this increased throughput rate in substantially reducing the time required to regenerate large batches of clay. The following data clearly demonstrates this advantage on clays of equal carbonaceous content.

| My kiln | | Multiple hearth kiln | |
|---|---|---|---|
| Clay feed rates, lbs./cu. ft./hr. | Effective burning surface, sq. ft./cu. ft. | Clay rate, lbs./1 cu. ft./hr. | Effective burning surface, sq. ft./cu. ft. |
| 20.0 | 8.5 | 0.8 | 1.9 |

A further advantage of the present method is the fact it may be carried out in an apparatus which has no moving parts except the pump for circulating the heat exchange medium. This not only makes construction and operation much simpler but considerably reduces the expense as compared, for example, to the commonly used multiple hearth burners wherein the rabble arms are rotated.

Another important feature of the present invention is the efficient utilization of the heat developed in burning. More heat is developed by burning most spent clays than is required and in my apparatus the combustion is conducted so efficiently that no additional fuel need be added in the usual case, in fact, in the usual case of regenerating spent petroleum filter clays, heat is extracted by my apparatus, being taken up by the liquid heat exchange medium and may be used for other purposes. Since the reaction is exothermic this is only as it should be, however, in every other process now in use heat must be added during the regeneration. For instance, the utilization of the heat developed by burning in the commonly used burners such as the multiple hearth type burner is so poor due to the amount of air used, loss to surroundings, etc., that additional fuel is added to burn off the impurities, the cost of this additional fuel for one average size refinery alone may be as high as $20,000 per year.

In the claims where I speak of solid particles or granules I means to include as a part of the particles or granules any solid or liquid matter that might be adhering to same as, for example, the solid or liquid petroleum matter adhering to spent clay.

I claim:
1. Apparatus for contacting solid particles and a gaseous agent for a treatment at closely controlled elevated temperatures comprising a chamber so constructed that said particles may be flowed through said chamber during the treatment, said chamber being of sufficient length in the direction of flow to permit proper treating time, means to flow said gaseous agent countercurrently through said chamber in direct contact with said particles, a plurality of spaced conduits disposed in said chamber and extending in the general line of particle flow being adapted to carry a flowing fluid heat exchange medium in indirect heat transfer relationship with said particles, the structure and positioning of said conduits being such that each particle during its entire treating period is within sufficiently close proximity to at least one of said conduits that the temperature of all particles may be maintained within a suitable treating temperature range while preventing any deleterious temperature occurring, means to flow fluid heat exchange medium through said spaced conduits, means to properly control the temperature of said fluid heat exchange medium, and a plurality of baffle means comprising fin members wound along said spaced conduits disposed substantially throughout the length of said treating portion of the chamber, said plurality of baffle means extending substantially across the chamber transversely to the direction of gas flow in the area not occupied by said spaced conduits and being disposed in such manner as to force substantially all particles and gaseous agent flowing through the chamber to take a baffled tortuous path therethrough.

2. Apparatus for contacting solid particle material and a gaseous agent for a treatment at closely controlled elevated temperatures comprising a chamber so constructed that said particles may be flowed down through said chamber during the treatment, said chamber being of sufficient length in the direction of flow to permit proper treating time, means to flow said gaseous agent upwardly through said chamber in direct contact with said particles, a plurality of spaced conduits positioned in said chamber and extending in the general line of particle flow being adapted to carry a flowing liquid heat exchange medium in indirect heat transfer relationship with said particles, the structure and positioning of said spaced conduits being such that each particle during its entire treating period is within sufficiently close proximity to at least one of said spaced conduits that the temperature of all particles may be maintained within a suitable treating temperature range while preventing any deleterious temperature occurring, means to flow liquid heat exchange medium through said spaced conduits, means to control the temperature of said liquid heat exchange medium so that the medium at all points in said portion of the chamber is at about the desired treating temperature, and a plurality of baffle means comprising fin members wound along said spaced conduits disposed in said portion of the chamber which plurality of baffle means extend substantially across the chamber transversely to the direction of gas flow in the area not occupied by said spaced conduits, the plurality of baffle means being disposed in such manner that said particles may flow through the chamber over the baffles and be distributed thereby throughout the treating period with tortuous, continuous, substantially particle-free passages being formed upwardly through said chamber for substantially all of said gaseous agent which permits the gaseous agent therein to be in direct contact with the particles along at least one edge of the particle-free passages.

3. Apparatus for regenerating granular adsorbent material such as clays and the like with a gaseous regenerating agent at closely controlled elevated temperatures comprising a chamber so constructed that said granular material may be gravitated through said chamber during regeneration, said chamber being of sufficient length in the direction of flow to permit proper regenerating time, means to flow said gaseous agent countercurrently through said chamber in direct contact with said granules, a plurality of spaced conduits positioned within said chamber and extending in the general direction of particle flow being adapted to carry a circulating liquid heat exchange medium in indirect heat transfer relationship with said granules, the structure and positioning of said spaced conduits being such that each granule during its entire regenerating period is not more than about 1½ inches from at least one of said conduits whereby the temperature of all granules may be maintained within a suitable regenerating temperature range while preventing any deleterious temperature occurring, means to circulate liquid heat exchange medium through said spaced conduits, means to maintain the temperature of the heat exchange medium in the chamber above inefficient regeneration temperature and below the minimum temperature which substantially damages the particles, and a plurality of baffle means comprising fin members wound along said spaced conduits disposed substantially throughout the length of said chamber, said plurality of baffle means extending substantially across the chamber transversely to the direction of gas flow in the area not occupied by said spaced conduits, and all baffles being located so that the granules may flow through the chamber and be distributed in such manner that substantially all of the gaseous agent may pass through the chamber in direct contact with the particles without having to pass through any portions of particles of substantial depth wherein the particles are not baffled to facilitate gaseous agent flow.

4. Apparatus for regenerating spent petroleum percolation clays by burning off the petroleum impurities with air comprising a chamber so constructed that said spent clay may be flowed through said chamber during regeneration, said chamber being of sufficient length in the direction of flow to permit proper regenerating time, means to flow air counter-currently through said chamber in direct contact with said particles, a plurality of spaced conduits positioned within said chamber and extending in the general direction of particle flow being adapted to carry a circulating molten salt heat transfer medium in indirect heat transfer relationship with said clay particles, the structure and positioning of said spaced conduits being such that each clay particle during its entire regenerating period is not more than about 1½ inches from at least one of said tubular members whereby the temperature of all particles may be maintained within a suitable regenerating temperature range while preventing any deleterious temperature occurring, means to circulate molten salt heat transfer medium in a circuit through said spaced conduits, means to cool said molten salt in said circuit so as to maintain its temperature in the chamber above temperatures at which inefficient combustion results and below the minimum temperature at which the clay particles are substantially damaged, and a plurality of baffle means comprising fin members wound along said spaced conduits disposed substantially throughout the length of said chamber, said plurality of baffle means extending substantially across the chamber transversely to the direction of gas flow in the area not occupied by said spaced conduits, and all baffles being located so that the clay particles and air may flow through said chamber and be distributed thereby in such manner that substantially all of the air may pass in a tortuous path up through the chamber in direct contact with the particles without having to pass through any portions of particles of substantial depth wherein the particles are not baffled to facilitate air flow.

5. Apparatus for contacting solid particles material and a gaseous material for a treatment at closely controlled elevated temperatures comprising a chamber so constructed that said particles may be flowed downwardly through said chamber during the treatment, said chamber being of sufficient length in the direction of flow to permit proper treating time, means to flow said gaseous agent upwardly through said chamber in direct contact with said particles, a plurality of spaced conduits disposed in said chamber and extending in the direction of particle flow being adapted to carry a liquid heat exchange medium in indirect heat exchange with said particles throughout substantially the entire portion of said chamber wherein said particles engaged in said treatment, the structure and positioning of said spaced conduits being such that each particle throughout its entire flow through said portion of said chamber is in sufficiently close proximity to at least one of said conduits that the temperature of all particles while in said portion may be maintained within a suitable treating range while preventing any deleterious temperature occurring, means to flow liquid heat exchange medium through said spaced conduits, means to properly control the temperature of said liquid heat exchange medium, and downwardly sloped helical fins affixed around each conduit and extending substantially the length of said zone, the width of the fins being such as to substantially cover the intervening space between the conduits and any portions of adjacent fins which are in longitudinal alignment being in different transverse planes whereby substantially all particles flowing down through the chamber will be forced to take a tortuous path over the top of the fins and substantially all the gaseous agent will take helical paths up through the chamber underneath said fins while directly contacting the particles along the sides of the helical paths.

6. Apparatus for contacting solid particle material and a gaseous material for a treatment at closely controlled elevated temperatures comprising a chamber so constructed that said particles may be flowed downwardly through said chamber during the treatment, said chamber being of sufficient length in the direction of flow to permit proper treating time, means to flow said gaseous agent upwardly through said chamber in direct contact with said particles, a plurality of spaced conduits disposed in said chamber and extending in the direction of particle flow being adapted to carry a liquid heat exchange medium in indirect heat exchange with said particles throughout substantially the entire portion of said chamber wherein said particles engage in said treatment, the structure and positioning of said spaced conduits being such that each particle throughout its entire flow through said portion of said chamber is in sufficiently close proximity to at least one of said conduits that the temperature of all particles while in said portion may be maintained within a suitable treating range while preventing any deleterious temperature occurring, means to flow liquid heat exchange medium through said spaced conduits, means to control the temperature of said liquid heat exchange medium within the range of proper treating temperatures, and helical fins having a downward slope at least equal to the angle of repose of said particles affixed around each conduit and extending substantially the length of said zone, the width of the fins being such as to substantially cover the intervening space between the conduits and any portions of adjacent fins which are in longitudinal alignment being in different transverse planes whereby substantially all particles flowing down through the chamber will be forced to take a tortuous path over the top of the fins and substantially all the gaseous agent will take helical paths up through the chamber underneath said fins while directly contacting the particles along the sides of the helical paths.

7. Apparatus for contacting solid refining adsorbent particles with a gaseous material at closely controlled elevated temperatures for increasing the efficiency of the particles comprising a chamber so constructed that said particles may be flowed downwardly through said chamber during the treatment, said chamber being of sufficient length in the direction of flow to permit proper treating time, means to flow said gaseous agent upwardly through said chamber in direct contact with said particles, a plurality of spaced conduits disposed in said chamber and extending in the direction of particle flow being adapted to carry a liquid heat exchange medium in indirect heat exchange with said particles throughout substantially the entire portion of said chamber wherein said particles engage in said treatment, the structure and positioning of said spaced conduits being such that each particle throughout its entire flow through said portion of said chamber is not more than about 1½ inches from at least one of said conduits so that the temperature of all particles while in said portion may be maintained within a suitable treating range while preventing any deleterious temperature occurring, means to flow liquid heat exchange medium through said spaced conduits, means to properly control the temperature of said liquid heat exchange medium, and downwardly sloped helical fins affixed around each conduit and extending substantially the length of said zone, the width of the fins being such as to substantially cover the intervening space between the conduits and any portions of adjacent fins which are in longitudinal alignment being in different transverse planes whereby substantially all particles flowing down through the chamber will be forced to take a tortuous path over the top of the fins and substantially all the gaseous agent will take helical paths up through the chamber underneath said fins while directly contacting the particles along the sides of the helical paths.

8. Apparatus for regenerating spent petroleum filter clays and the like by burning off petroleum impurities with air comprising a chamber so constructed that said spent filter particles may be flowed downwardly through said chamber during the treatment, said chamber being of sufficient length in the direction of flow to permit proper regenerating time, means to flow said air upwardly through said chamber in direct contact with said particles, a plurality of spaced conduits disposed in said chamber and extending in the direction of particle flow being adapted to carry a liquid heat exchange medium in indirect heat exchange with said particles throughout substantially the entire portion of said chamber wherein said particles undergo regeneration, the structure and positioning of said spaced conduits being such that each particle throughout its entire flow through said portion of said chamber is not more than about 1½ inches from at least one of said conduits so that the temperature of all particles while in said portion may be maintained within a suitable regenerating range while preventing any deleterious temperature occurring, means to flow liquid heat exchange medium through said spaced conduits, means to cool said liquid heat exchange medium so as to maintain its temperature between the minimum efficient regenerating temperature and the maximum regenerating temperature which does not substantially damage the particles, and downwardly sloped helical fins affixed around each conduit and extending substantially the length of said zone, the width of the fins being such as to substantially cover the intervening space between the conduits and any portions of adjacent fins which are in longitudinal alignment being in different transverse planes whereby substantially all particles flowing down through the chamber will be forced to take a tortuous path over the top of the fins and substantially all the air will take helical paths up through the chamber underneath said fins while directly contacting the particles along the sides of the helical paths.

9. Apparatus for regenerating spent solid particle adsorbents containing carbonaceous matter comprising a chamber, means near the top of the chamber for introducing said spent particles, means near the bottom of the chamber for discharging regenerated adsorbent, means distributed throughout the chamber adapted to carry a flowing liquid heat exchange medium within sufficiently close indirect heat exchange with every particle in the chamber that the temperature of all particles may be maintained within a proper regenerating range without any deleterious temperature occurring, means to flow liquid heat exchange medium through said distributed means, means to maintain the temperature of said liquid heat exchange medium above inefficient regenerating temperatures and below temperatures which substantially damage the particles, means near the bottom of the chamber for introducing a regenerating gaseous agent, means near the top of the chamber for withdrawing gaseous agent and helical baffles disposed within the chamber in such manner that the particles flowing through the chamber will be distributed forming tortuous substantially continuous particle-free passages upwardly through the chamber for substantially all of said gaseous agent and which permits the gaseous agent therein to be in direct contact with the particles.

JOHN W. PAYNE.

CERTIFICATE OF CORRECTION.

Patent No. 2,226,535.  December 31, 1940.

JOHN W. PAYNE.

It is hereby certified that error appears in the printed specification of the above numbered patent requiring correction as follows: Page 2, first column, line 68, for "throughout" read --throughput--; and second column, line 47, for "adsorbent" read --adsorbed--; page 3, second column, line 9, for "pertoluem" read --petroleum--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.